5/6/86 XR 4,586,799

United States Patent [19]

Hayashi et al.

[11] Patent Number: 4,586,799

[45] Date of Patent: May 6, 1986

[54] EXPOSURE APPARATUS

[75] Inventors: Nobuyasu Hayashi, Chiba; Takashi Fujimura, Mobara, both of Japan

[73] Assignee: Hitachi, Ltd., Tokyo, Japan

[21] Appl. No.: 706,183

[22] Filed: Feb. 27, 1985

[30] Foreign Application Priority Data

Feb. 27, 1984 [JP] Japan .................................. 59-34226

[51] Int. Cl.[4] ........................ G03B 41/00; G02B 13/18

[52] U.S. Cl. ......................................... 354/1; 350/432

[58] Field of Search ................. 354/1; 430/23, 24, 26; 350/432, 434; 358/250, 251, 252; 313/474

[56] References Cited

U.S. PATENT DOCUMENTS

| | | | |
|---|---|---|---|
| 4,187,013 | 2/1980 | Fujimura et al. | 354/1 |
| 4,206,986 | 6/1980 | Kotoyori | 354/1 |
| 4,414,565 | 11/1983 | Shanks | 358/250 X |

*Primary Examiner*—William B. Perkey

*Attorney, Agent, or Firm*—Antonelli, Terry & Wands

[57] ABSTRACT

In an exposure apparatus of the type in which a light source, formed by fixing a light emitting tube, housed uner a cover except a partial opening, inside a lamp housing filled with cooling water, is disposed in such a fashion that the opening faces an exposed surface via a transparent faceplate of the lamp housing and the light source is rotatable with the center axis of the exposed surface, perpendicular thereto, being the axis of rotation, the invention discloses an exposure apparatus wherein the faceplate of the lamp housing consists of a saddle-shaped lens having a concave surface in the radial direction of the light emitting tube and a convex surface in the axial direction. Ths exposure apparatus reduces the apparent movement of the light source with the rotation of the light source portion, and can improved exposure accuracy.

3 Claims, 12 Drawing Figures

EXPOSURE APPARATUS

BACKGROUND OF THE INVENTION

This invention relates to an exposure apparatus of the type in which a light source formed by fixing a light-emitting tube in a lamp housing filled with cooling water is rotatably supported, and which can be employed for forming, for example, a phosphor screen for a color display tube.

In a conventional exposure apparatus of the kind described above, the light source is constructed by disposing a light emitting tube, with a cover having a slit opening partly, in water. Therefore, the apparent position of the light source resulting from refraction by cooling water rises from the true position of the light source, and the exposure position accuracy is undesirably reduced when a black matrix film for a color picture tube or a phosphor film for such a tube is formed, for example. In the case of producing, for instance, a dot type color picture tube, exposure is effected while the light source is rotating with its axis of rotation being the vertical center axis with respect to the panel inner surface of the picture tube, which is the exposed surface or the surface to be exposed. Since the virtual light source has a rectangle shape which is long in the direction defined by the slot in the cover, the aspect of the rising for the longitudinal axis of the light emitting tube is different from that for the transverse axis, particularly at the peripheral region of the panel. In consequence, the projected image of the light source revolves with the rotation of light source, thereby reducing exposure accuracy. If the dimensions of the light source for forming black matrix film differ from those for phosphor film, the center positions of the dots will become different from the suitable site. That is, the black matrix hole and the phosphor dot will appear,undesirably, in different positions.

The following references are cited to show the state of the art:

(1) U.S. Pat. No. 4,187,013 and (2) U.S. Pat. No. 4,206,986.

SUMMARY OF THE INVENTION

To eliminate the problems with the conventional technique described above, the present invention is directed to provide an exposure apparatus which prevents the deviation of the projected light image position especially in the peripheral portion of an exposed surface, resulting from the apparent rise of the light source and which improves exposure accuracy.

To accomplish the object described above, the present invention provides an exposure apparatus having a construction in which a light source formed by fixing a light-emitting tube, housed under a cover except its partial opening, inside a lamp housing filled with cooling water is disposed in such a fashion that the opening faces the exposed surface via a transparent faceplate of the lamp housing and the light source is rotatable with the center axis of the exposed surface, perpendicular thereto, being its axis of rotation, wherein the faceplate of the lamp housing consists of a saddle-shaped lens, the so-called "toroid lens" having a concave surface in the radial direction of the light-emitting tube and a convex surface in the axial direction, to make the apparent rise of the light source substantially equal in both the radial and axial directions of the light-emitting tube and to compensate for the apparent movement of the light source.

Figure 1:
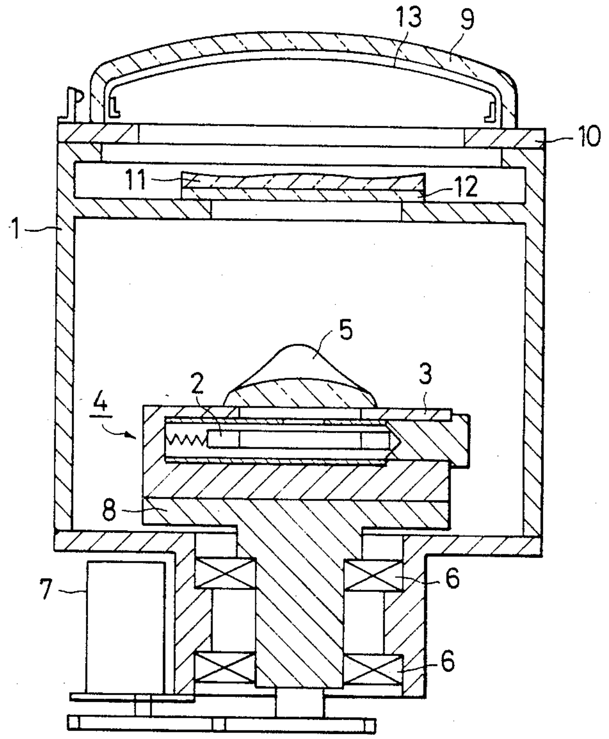
FIG. 1 is a schematic sectional view of an exposure apparatus in accordance with one embodiment of the present invention.
Figure 3:
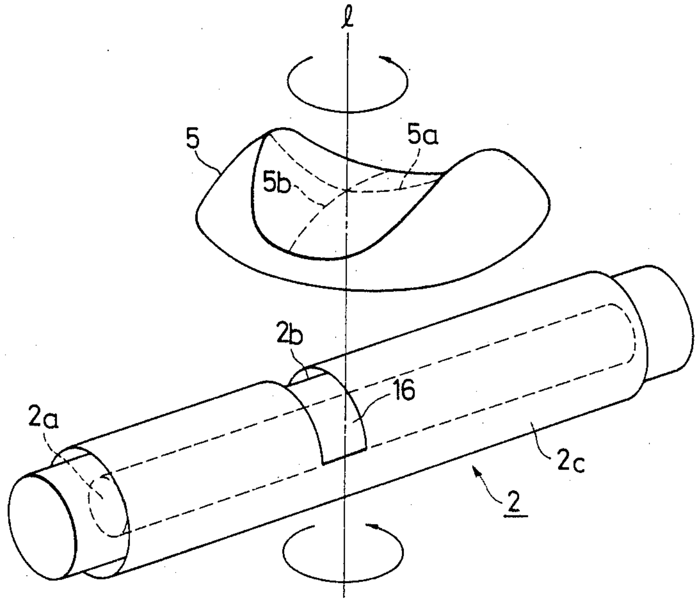
Figure 7:
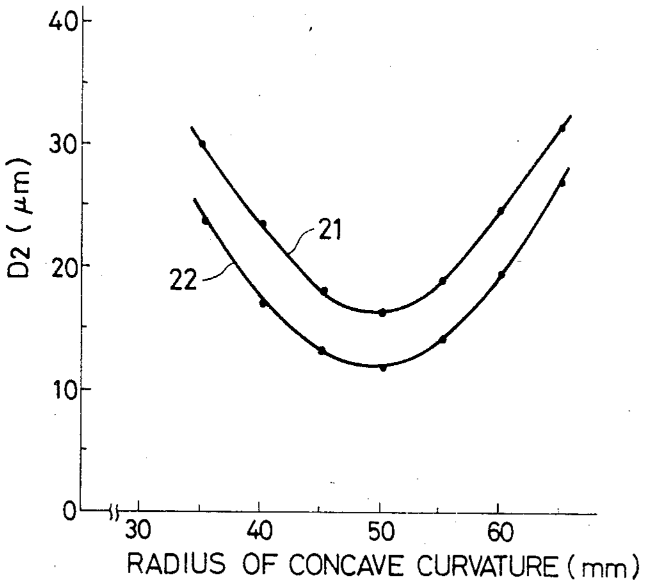
Figure 8:
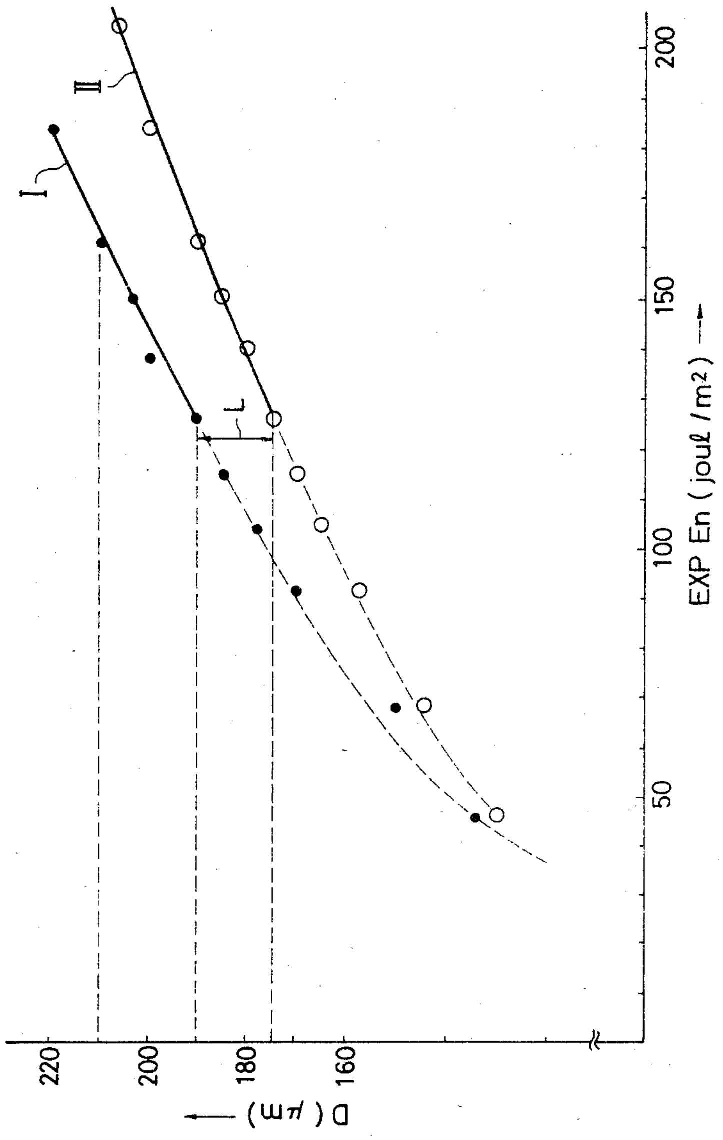

FIGS. *2a* and *2b* are enlarged schematic views for explaining the light emitting portion of the exposure apparatus of FIG. 1;

FIG. 3 is an enlarged schematic perspective view of the light emitting portion of the exposure apparatus shown in FIG. 1;

FIGS. *4a* and *4b* are schematic views for explaining the light emitting portion of a conventional exposure apparatus;

FIGS. *5a* and *5b* graph the apparent rise of the light source in the conventional exposure apparatus;

FIG. *6a* graphs the profile of the exposure light in the conventional exposure apparatus;

FIG. *6b* graphs the profile of the exposure light in the exposure apparatus of one embodiment of the present invention;

FIG. 7 graphs the relation between the radius of curvature of a saddle-shaped lens and the distance between the centers of the profiles of the exposure lights; and FIG. 8 graphs the relation between the exposure light energy density and the spot diameter of the exposure light in the conventional exposure apparatus and in the exposure apparatus of the present invention.

DESCRIPTION OF THE PREFERRED EMBODIMENTS

FIG. 1 is a sectional structural view showing an exposure apparatus in accordance with the present invention. The drawing illustrates the application of the invention to the formation of a phosphor screen inside the panel of a color picture tube. In the drawing, a light-emitting tube 2 consisting of a ultra-high pressure mercury lamp and a lamp house 3 for holding and fixing the light emitting tube 2 are arranged at the lower part of, and inside, the casing 1 of the apparatus as to constitute a light source 4. A faceplate 5 consisting of a saddle-shaped lens to concentrate the light emitted from the light-emitting tube 2 is disposed on the side, facing to the exposed surface, of the lamp housing 3. The light source 4 and the faceplate 5 are disposed on a rotary bed 8 equipped with a bearing 6 and a driving motor 7 so as to be capable of rotating inside a plane including the longitudinal direction of the light emitting tube 2. A panel 9 constituting the color picture tube is on a plate 10 above the casing 1 so that it faces the light source and its inner surface side as the exposed surface also faces the light source 4. A compensating lens 11 and a filter 12 are disposed between the panel 9 and the light source 4. A shadow mask 13 is fitted to the inner surface of the panel 9.

Figure 2A:
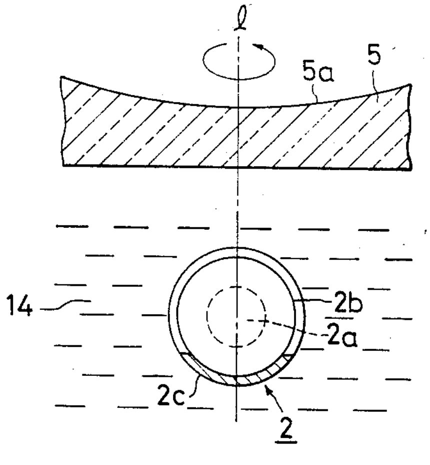
Figure 2B:
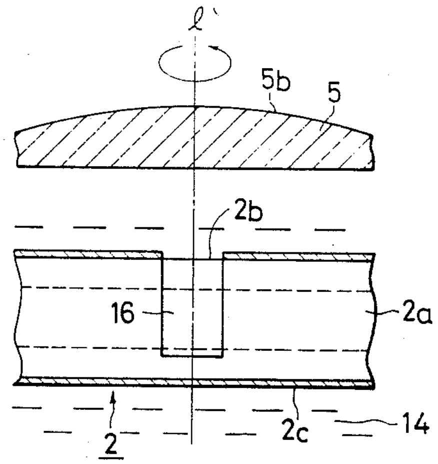

In the light source described above, the light emitting tube 2 consists of a light emitting portion *2a* and an external tube *2b* as shown in FIGS. *2a, 2b,* and 3, and a cover *2c* is wound on the outer circumference of the external tube *2b*. Therefore, an opening 16 of this cover *2c* facing the panel 9 substantially functions as the exposure light source. The exposure light source is substantially symmetric with the axis l of rotation of the rotary bed 8 (see FIG. 1; the axis l of rotation being in agreement with the perpendicular center axis of the inner surface of the panel 9). The peripheral portion of the light emitting tube 2 is filled with cooling water 14. In the drawings, reference numeral 5 denotes the faceplate which consists of transparent glass and is disposed on the surface of the lamp house 3 opposing the panel 9. FIG. 2*a* is a view into the longitudinal axis of the light-emitting tube 2, FIG. 2*b* is a view perpendicular to the longitudinal axis of the light-emitting tube 2, and FIG. 3 is an obliquely viewed. As is obvious from these drawings, the faceplate 5 is the saddle-shaped lens which is concave (5*a*) in the radial direction of the light emitting tube 2, and convex (5*b*) in the axial direction.

Figure 4A:
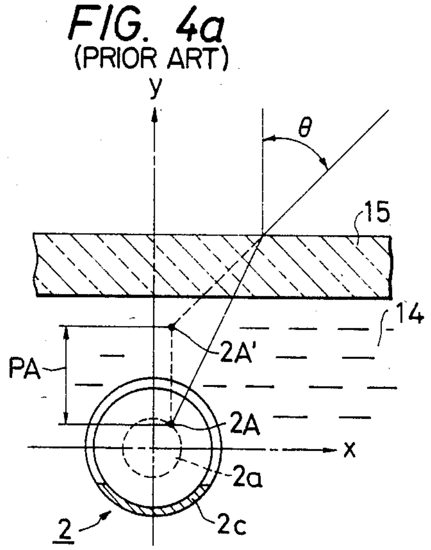
FIG. 4a (PRIOR ART)
Figure 4B:
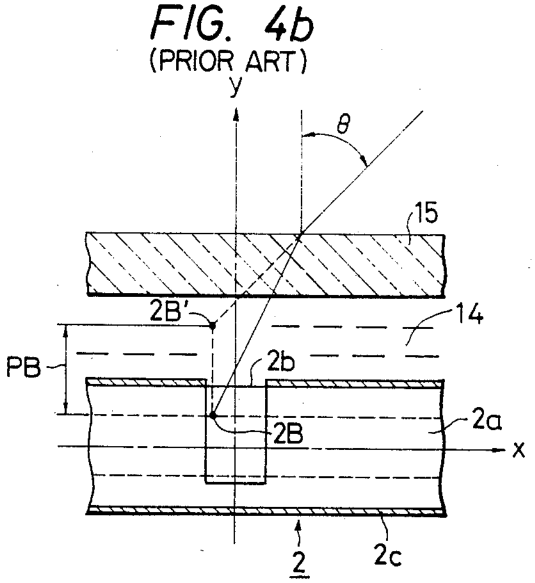
FIG. 4b (PRIOR ART)
Figure 5A:
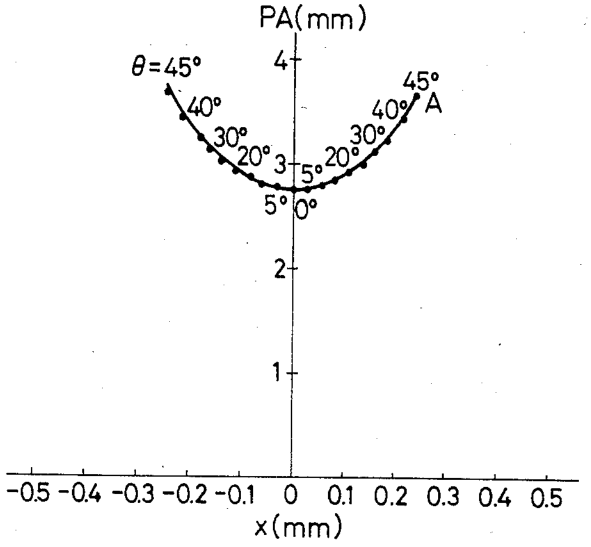
FIG. 5a (PRIOR ART)
Figure 5B:
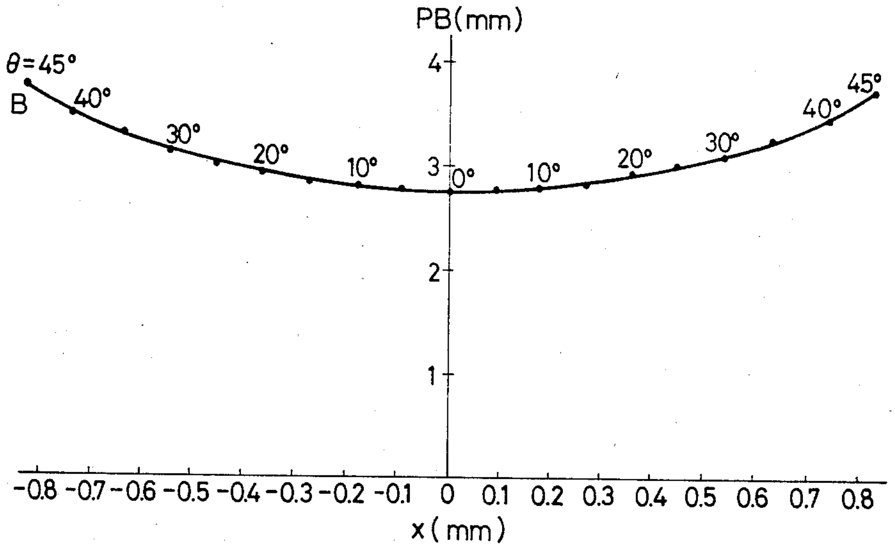
FIG. 5b (PRIOR ART)

In the construction described above, the ray of light emitted from the light source 4 passes through the filter 12 and the compensating lens 1, then through the shadow mask 13 and reaches the inner surface of the panel 9. In the conventional exposure apparatus, the ray of light emitted from the light emitting tube 2 passes through the water 14 and the flat plate-like faceplate 15 made of glass that have different refractive indices, and comes out into the air as shown in FIGS. 4*a* and 4*b*. Therefore, when viewed from one point in the direction of an angle $\theta=45°$ on the inner surface of the panel 9 as the exposed surface, the centers 2A and 2B of the exposure light source are substantially positioned at the apparent positions 2A′ and 2B′, respectively, thereby causing rise of PA and PB. Here, the substantial light source has a rectangular curved surface which is elongated in one direction defined by the opening 16 of the cover 2*c*, that is, in the radial direction of the light emitting tube. Therefore, not only is the rise direction different from the case where it is viewed perpendicular to the longitudinal axis, such as the ray of light shown in FIG. 4*a* and the case where it is viewed longitudinally, such as the ray of light shown in FIG. 4*b*, but also the rising distance varies with the angle $\theta(=0°\sim45°)$ of view as shown in FIGS. 5*a* and 5*b*. Thus, the projected image of the light source makes a revolution motion, and reduces the accuracy of exposure, as has already been described.

In the present invention, therefore, the faceplate 5 has the saddle-shaped lens structure as already described, so that the rises PA and PB are substantially equal in both directions mentioned above. That is, the saddle-shaped lens has a concave surface 5*a* in the direction perpendicualr to the longitudinal axis of the light-emitting tube, and a convex surface 5*b* in the direction of the longitudinal axis so that the ray of light incident to the saddle-shaped curved surface is refracted in such a manner as to correspond to the radius of curvature of these curved surfaces. When such a faceplate 5 of the saddle-shaped lens is employed, the rise PA perpendicular to the longitudinal axis of the light emitting tube 2 and the rise PB along the longitudinal axis are relatively compensated for to substantially the same rise ($PA \approx PB$) and are thus brought into agreement with each other. Furthermore, the apparent movement of the light source on the X axis in both directions with respect to the axis l of rotation can be compensated for to substantially the same. Therefore, the roundness of the projected image of the exposure light source passing through the shadow mask 13 can be improved, and the quality of the phosphor film to be formed can also be improved.

In this embodiment, a saddle-shaped lens having a 40 mm radius of curvature for the concave and convex surfaces and 8 mm thick at the center is employed as the faceplate 5 shown in FIGS. 1,2*a*,2*b* and 3. The tube diameter of the light emitting portion 2*a* (so-called "arc width") is 1 mm, the diameter of the external tube 2*b* is 4 mm, the outer and inner diameters of the cover 2*c* are 6 mm and 5.4 mm, respectively, the width of the opening 16 of the cover 2*c* in the axial direction is 2 mm, and the distance between the center line of the light emitting tube 2 and the bottom surface of the faceplate 5 is 4 mm.

As a comparative example, a conventional exposure apparatus having an flat plate-like faceplate of 4 mm thick is used.

Figure 6B:
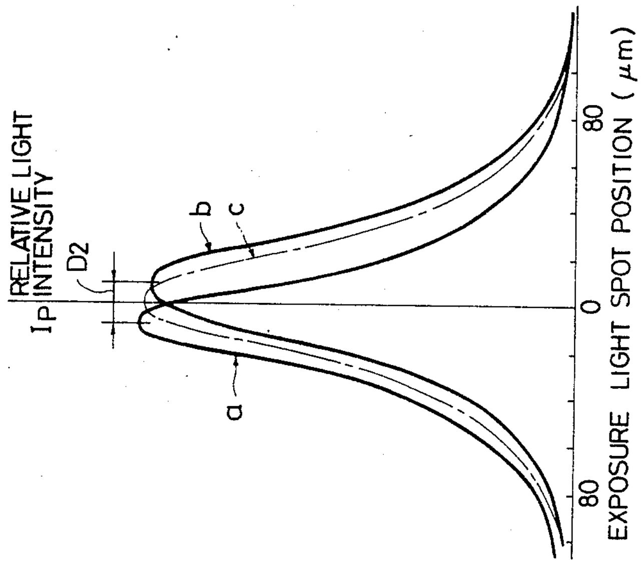
Figure 6A:
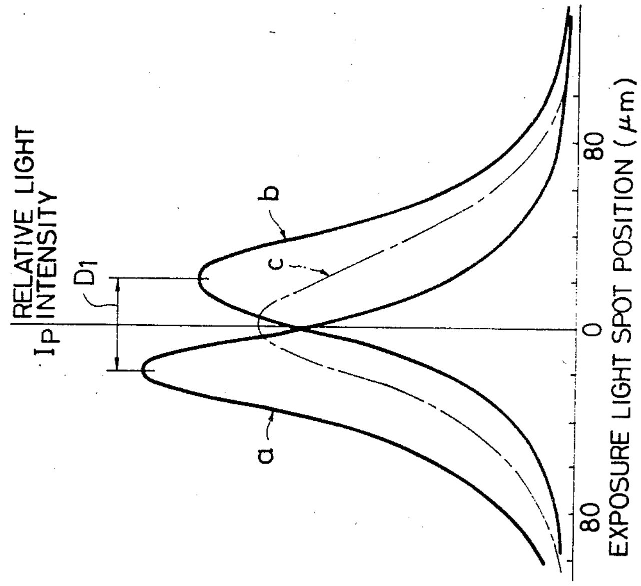
FIG. 6a (PRIOR ART)

FIGS. 6*a* and 6*b* illustrate the spot shapes of the exposure light (that is, the light profiles) in the conventional exposure apparatus and in the exposure apparatus of the present invention, respectively.

In the conventional exposure apparatus, the spot shape of the exposure light when observed from an angle $\theta$ of 45° with respect to the exposure light source will be examined. The apparent movement of the light source, that is, the apparent movement of the light source from the coordinates of position A (0.24, 3.65) in FIG. 5*a* to the coordinate of position B (−0.82, 3.75) is given as follows:

$$\sqrt{(-0.82-0.24)^2+(3.75-3.65)^2}=1.06\text{ mm}$$

The distance $D_1$ between the centers of the exposure light profiles, projected by the light sources corresponding to the above coordinates A and B, can be determined in the following way.

The ratio Q/P of the distance P from the light source to the shadow mask 13 to the distance Q from the shadow mask 13 to the phosphor film is 1/27 in the comparative example and in the embodiment of the invention; hence, $$D_1=1.06\times Q/P=39.3\ (\mu m)$$

In FIGS. 6*a* and 6*b*, curve a represents the spot shape of the exposure light in the radial direction, curve b represents the spot shape in the axial direction and curve c represents the spot shape synthesized from the curves a and b.

Next, the profile of the exposure light observed from an angle $\theta$ of 45° with respect to the exposure light source in the exposure apparatus of the present invention will be examined in the same way as above. In this embodiment, employing the saddle-shaped lens having a radius of curvature of 40 mm as the faceplate, the apparent movement of the light source is about 0.46 mm, and this value is about 1/2.3 in comparison with the value of the conventional exposure apparatus described above. The distance $D_2$ between the centers of the exposure light profiles is $0.46\times Q/P=17\ (\mu m)$. Therefore, it has been found that the shape of the resultant synthesized profile can also be improved. The difference of the apparent rise of the light source can be substantially neglected.

The relative light intensity curves in FIG. 6*a* are in the order of curve a > curve b > curve c, but it has been found that in FIG. 6*b*, the curves are in the order of curve a > curve c > curve b.

As described above, the exposure apparatus of the present invention uses a faceplate consisting of a saddle-shaped lens in place of the flat plate-like faceplate in the conventional exposure apparatus, and an optimal radius of curvature of the saddle-shaped lens varies with each dimension of the exposure apparatus. It is therefore advisable to determine experimentally the radius of curvature of the saddle-shaped lens with reference to the embodiment described above. In this case, with respect to the apparent movement of the light source viewed in the axial direction of the light-emitting tube 2 and in the direction perpendicular to the axial direction, it is more preferable that when the phosphor dot is to be formed, for example, the distance between the centers of the exposure light profiles is up to about 17 μm. If the distance between the centers is greater than this value, the deviation of position of the projected image of the light source will occur, and the accuracy of exposure, will also undesirably drop. The maximum allowance for the distance between the centers of the exposure light profiles varies with the object of use of the exposure apparatus.

FIG. 7 is a diagram showing the relation between the radius of curvature of the saddle-shaped lens and the distance $D_2$ between the centers of the exposure light profiles in the exposure apparatus having the dimensions described in the embodiment described above. The relation was determined by experiments. Curve 21 is the case where the radius of curvature of the convex surface 21 is 50 mm, and curve 22 represents the case where the radius of curvature is 40 mm. It is evident from this diagram that a combination of radii of curvature corresponding to the region where $D_2$ is below 17 μm may be used.

The optimal value of the radius of curvature of the saddle-shaped lens can be determined in the same way as described above for exposure apparatus having different dimensions.

FIG. 8 illustrates an example in which the light source of the present embodiment is applied to the exposure of a phosphor film. In the diagram, the spot diameter D of exposure light is plotted on the ordinate while the exposure light energy density, that is, [light emission quantity (W/m$^2$) of the light source×time (sec)=EXP En(joul/m$^2$)], is plotted on the abscissa. The regions indicated by dashed lines in curves I and II in the diagram represent the range in which the dot loss occurs when the dot is formed on phosphor film. The upper limit, at which dot loss does not occur, is about 190 μm in accordance with the conventional light source represented by curve I, whereas a phosphor dot as small as about 175 μm in diameter can be formed reliably when the light source of the present embodiment is used. Since the spot shape of the exposure light is thus improved, the margin L against the dot loss (L=15 μm in FIG. 8) can be extended. Also, since the exposure light energy density can be increased, the density of the phosphor film can be also increased, and since the dot shape can be improved, the positional accuracy and resolution of the dot can be also improved. Thus, the productivity and the quality of the phosphor film become higher by the present invention.

Though the embodiment described above deals with the case where a phosphor dot is formed, the present invention is not particularly limited thereto. When, for example, the invention is applied to the formation of a black matrix, the shape, accuracy and sharpness of the black matrix hole can of course be improved. If the invention is applied to a dry process, exposure time can be shortened because the exposure light density can be improved.

Conventional teachings and observations in the art may be employed as such for those which are not particularly described in this specification.

As described above, the exposure apparatus of the present invention uses a saddle-shaped lens as the faceplate of the lamp housing holding the light-emitting tube in water, and compensates for the apparent rise and movement of the light source. Therefore, the present invention can reduce or eliminate the apparent deviation of the light source resulting from the rotation of the light source, and can improve exposure accuracy. Therefore, when producing a color picture tube, chipping and protruding due to the deviation of the phosphor dot can be prevented, and the quality and productivity of the phosphor film can be improved.

Obviously, many modifications and variations of the present invention are possible in the light of the above teachings. It is therefore to be understood that within the scope of the appended claims, the invention may be practised otherwise than as specifically described.

What is claimed is:

1. In an exposure apparatus of the type in which a light source, formed by fixing a light emitting tube, housed under a cover except a partial opening, inside a lamp housing filled with cooling water, is disposed in such a fashion that said opening faces an exposed surface via a tranparent faceplate of said lamp housing and said light source is rotatable with the center axis of said exposed surface, perpendicular thereto, being the axis of rotation, the improvement wherein said faceplate of said lamp housing consists of a saddle-shaped lens having a concave surface in the radial direction of said light emitting tube and a convex surface in the axial direction.

2. The exposure apparatus as defined in claim 1 wherein the radius of curvature of said saddle-shaped lens is selected so that the distance between the centers of exposure light profiles is below a predetermined value.

3. The exposure apparatus as defined in claim 1 wherein said opening has a rectangular curved surface which is elongated in the radial direction of said light emitting tube.

* * * * *